Dec. 11, 1934. W. M. SCOTT 1,983,817
CONTROL SYSTEM
Filed Oct. 24, 1933 2 Sheets-Sheet 1

INVENTOR.
William M. Scott
Cornelius L. Ehret
his ATTORNEY.

Dec. 11, 1934.                    W. M. SCOTT                    1,983,817
                                 CONTROL SYSTEM
                              Filed Oct. 24, 1933              2 Sheets-Sheet 2
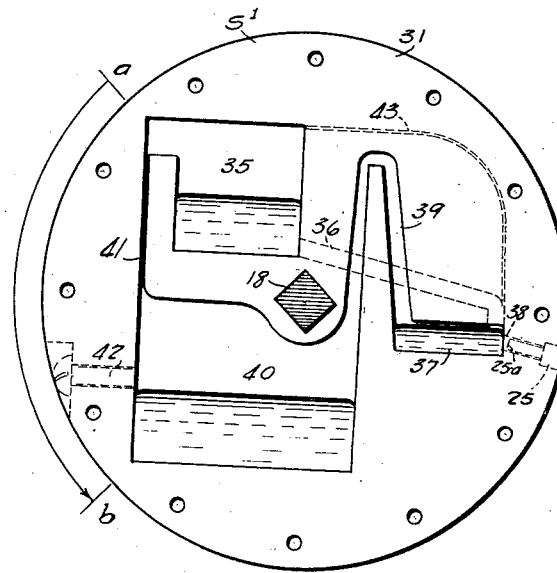
FIG. 4
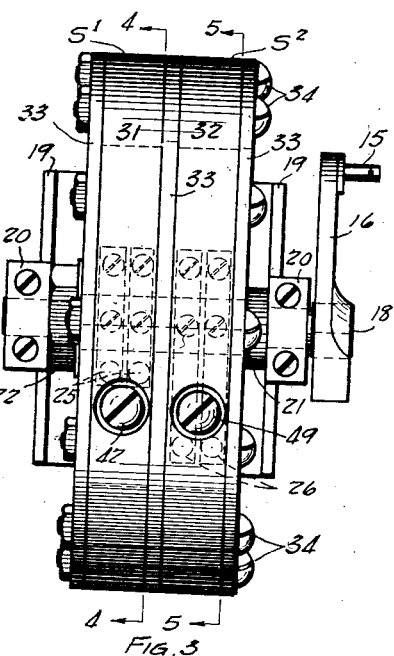
FIG. 3
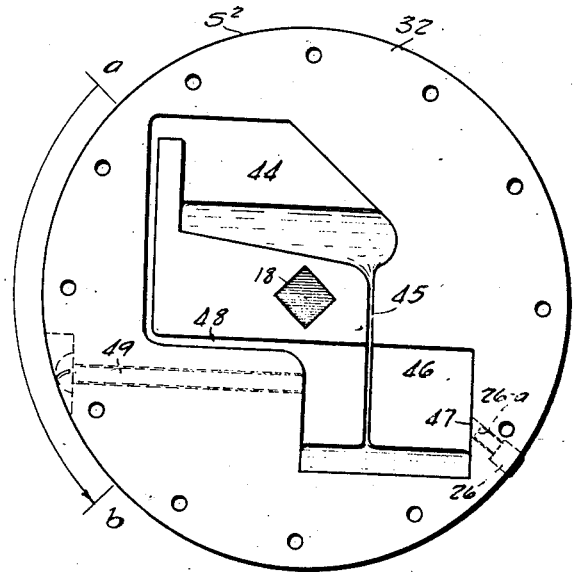
FIG. 5
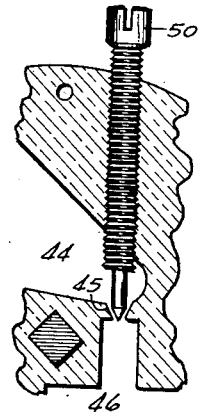
FIG. 5-a
INVENTOR.
William M. Scott
BY Cornelius L. Ehret
his ATTORNEY.

Patented Dec. 11, 1934

1,983,817

UNITED STATES PATENT OFFICE 1,983,817

CONTROL SYSTEM

William M. Scott, Tredyffrin Township, Chester County, Pa., assignor to I-T-E Circuit Breaker Company, Philadelphia, Pa., a corporation of New Jersey Application October 24, 1933, Serial No. 694,947

23 Claims. (Cl. 175—294)

My invention relates to a system and apparatus for controlling a device, for example, circuit breaker mechanism, operative upon the occurrence of an abnormal condition.

This application is a continuation in part of my application Serial No. 598,145 filed March 11, 1932, and abandoned in favor of this application.

In accordance with the invention, a main switch, or automatic circuit breaker, is moved to normal position, as circuit closing position, after it has been opened or tripped in response to overload, or other abnormal electrical condition, by an electromotive device controlled by flow of fluid, specifically mercury, in control switch apparatus; mechanism causes the control switch to be moved a plurality of times in succession, in response to successive opening movements of the main switch or circuit breaker, to a position causing flow of the said fluid and actuation thereby of the electromotive device to effect a corresponding number of reclosures of the main switch or circuit breaker.

The control switch is adapted to provide a predetermined time interval between the opening and reclosing movements of the circuit breaker, and also prevents actuation of the electromotive device in response to the cumulative effect of flow of successive masses of the fluid from a reservoir or chamber due to successive reopening movements of the circuit breaker; more particularly, the control switch has a reservoir of mercury from which gravitational flow of the mercury to close a circuit between electrodes or contact elements in an enclosing chamber is controlled by the physical position of the control switch, as determined by the condition of the circuit breaker, the rate of flow of the mercury being determined by the area of an opening or passage interconnecting said reservoir and chamber, the control switch having another reservoir of mercury from which gravitational flow of the mercury to close a circuit between electrodes or contact elements in an enclosing chamber or measuring cup is also controlled by the physical position of the control switch, as determined by the condition of the circuit breaker, and after a predetermined number of successive opening movements thereof, the reservoir is emptied and no further flow of mercury occurs to close the circuit between the last-named contact elements, the contact elements of said chambers jointly controlling the actuation of said electromotive device for closing the circuit breaker.

Further, in accordance with the invention, the control switch apparatus may comprise individual units acting cojointly, and secured together to form a unitary structure, or the individual units may be separated, and in either case any of the units may be removed for inspection, repair, or replacement, or for the purpose of changing the operating characteristics of the control system; more particularly, in a control switch comprising two units, one of the units controls the number of successive reclosing movements of the circuit breaker and causes the same to be locked out after a predetermined number of successive opening movements, and the other unit controls the time interval between the successive opening and reclosing movements of the circuit breaker, and either of said units may be replaced by corresponding units having different operating characteristics to thereby give a different number of successive reclosing movements, or different timing characteristics, or both, to the circuit breaker.

Further, in accordance with the invention, the units of the control switch are adapted to be made from moldable insulating material, for example, a phenolic condensation product, and the contact structure within the units comprises electrodes or contact elements fixed relatively to each other, and therefore, the switch may be inexpensively made, with no moving parts or complicated mechanism, and requires no repair or replacement of parts over long periods of service.

Further, in accordance with the invention, the control switch has means for insuring a quick make mercury contact, and also insures that an amount of mercury sufficient to carry substantial current will contact with the electrodes at the time of making contact; more particularly, the electrodes of each unit are positioned within a recess or recesses opening into a measuring chamber into which the mercury flows, and the recesses have a small cross-section, as compared to that of the measuring chamber, so that when the convex meniscus of the mercury in the chamber breaks, and mercury flows into the recesses, a quick make contact will be obtained, and there will also be ample depth of mercury in contact with the electrodes to carry the current required.

My invention resides in the features of combination, construction and arrangement hereinafter described and claimed.

For an understanding of my invention, and for illustration of some of the various forms it may take, reference is had to the accompanying drawings, in which:

Fig. 3 is a front view of the control switch.

Fig. 4 is a view of the switch showing the arrangement of various chambers and passages, taken along the line 4—4 of Fig. 3.

Fig. 5 is a view of the control switch showing other chambers and passages, taken along the line 5—5 of Fig. 3.

Fig. 5a is a fragmentary view of a modification of the structure of Fig. 5.

It is often desirable or necessary to protect an electrical circuit with circuit breakers adapted to be automatically opened, as by a tripping coil, upon the occurrence of various abnormal conditions in the circuit controlled thereby. Abnormal conditions, for example, short circuits, may cause the circuit breaker to open and these conditions may disappear before a first or subsequent reclosing movement of the circuit breaker. The reclosing of a circuit breaker under such conditions may be accomplished automatically by providing auxiliary or control switch mechanism which is actuated in accordance with movement of the circuit breaker, and which energizes the closing mechanism of the circuit breaker to reclose the same a number of times upon successive opening movements of the circuit breaker, and after a predetermined number of successive openings, to prevent further reclosing movement of the circuit breaker until the same has been manually or otherwise closed.

The control switch illustrated herein is adapted to complete the energizing circuit of the electromotive closing device of a circuit breaker after the breaker has been opened, and will function recurrently, and the number of reclosing operations, and the lag or time interval between successive opening and reclosing movements, may readily be adjusted; where abnormal circuit conditions remain, the switch will close the circuit breaker a predetermined number of times, and then lock out to prevent further reclosing until the circuit breaker is closed by hand, or by auxiliary means, but if the circuit breaker remains closed for a given length of time after having been reclosed, the control switch automatically resets itself so that in subsequent openings the cycle of reclosing operations starts over again.

Figure 1:
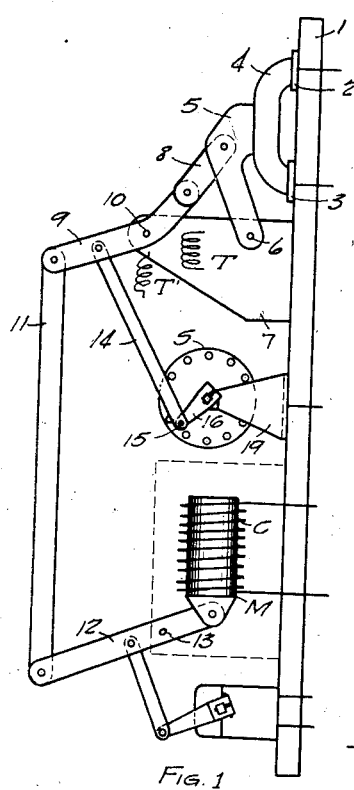
Figure 1 is a diagrammatic, side elevational view of a control switch in combination with an automatic circuit breaker.

Referring to Fig. 1 of the drawings, there is shown a circuit breaker mounted on a supporting panel 1 of slate or other suitable insulating material, the circuit breaker having main contacts 2 and 3 between which a circuit is established, when the circuit breaker is closed, by a main bridge contact element 4. The circuit breaker is of the usual construction and, therefore, its various details are not shown; it will be understood that it includes the usual shunt or arcing contacts and also suitable latching mechanism for holding the circuit breaker in closed position. Tripping mechanism for unlatching and opening the circuit breaker, either automatically in response to an abnormal condition, or in response to manual or other control means, is diagrammatically indicated by the tripping coils T and T'.

The main bridge element 4 is carried by an arm 5 pivotally mounted at 6 to a support 7 secured to and extending from the panel 1. Link member 8 is pivotally secured at one end to the lever 5, and at the other end to a lever 9 pivotally mounted at 10 to the support 7, and representing the usual toggle mechanism of a circuit breaker. Lever 9 is connected by link 11 and lever 12, pivotally mounted at 13 to supporting structure secured to and extending from a panel 1, one end of lever 12 being pivotally connected to the solenoid plunger M operating within the closing coil C. When current is caused to flow through the closing coil or solenoid C, the solenoid plunger M is drawn into the coil, as in the position shown in Fig. 1, and this action causes counter-clockwise rotation of the lever 12, as viewed in Fig. 1, which, through the system of levers and links shown, causes the circuit breaker to latch in closed position. When the circuit breaker is opened, as by the tripping coil T, the lever 12 is rotated in a clockwise direction, as viewed in Fig. 1.

Movement of the lever 9 is transmitted, by means of a link 14, pivotally secured to an arm 16, to the control switch, generally designated at S, so that the control switch is rotated through an angle of approximately 90° to either of two positions, dependent upon whether the circuit breaker is in open or closed position.

Figure 2:
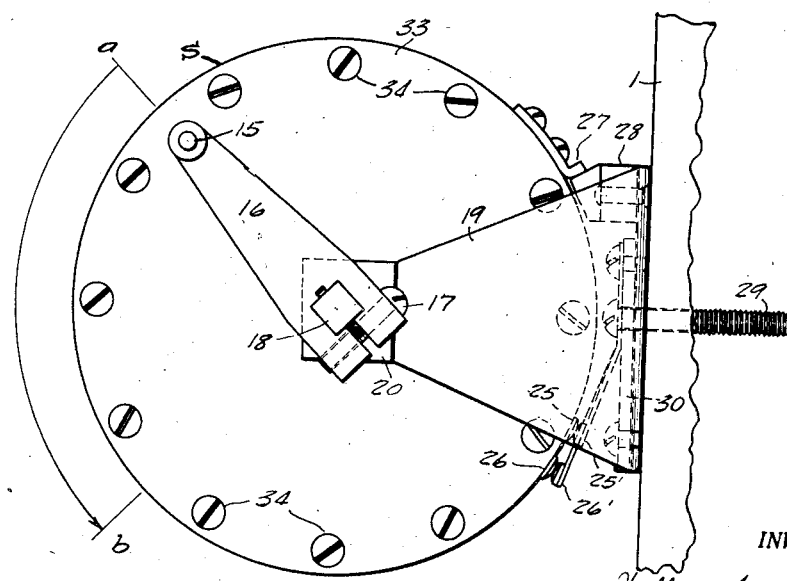
Fig. 2 is a side elevational view of the control switch, showing the same in position corresponding to open position of the circuit breaker.

As shown in Figs. 2 and 3, the control switch S is mounted on a shaft 18 carried by bearings 20, secured to a U-shaped plate 19, supported by and extending from the panel 1. In Fig. 1 the control switch is shown in a position corresponding to closed position of the circuit breaker, and in Figs. 2 and 3 the control switch is shown as having been rotated 90° from b to a and is in a position corresponding to an open position of the circuit breaker.

A stop member 27 mounted on the control switch cooperates with fixed stop member 28, mounted on the panel 1, to insure that when the switch is in the position of Figs. 2 and 3, the terminals or contacts 25 and 26 on the control switch would be in a proper position to engage complementary fixed spring contacts 25' and 26' secured to and extending from the panel 1. The fixed contacts are insulated from the support 19 in any suitable manner, as by a sheet of insulation 30, and connection to an external circuit is made through screw-threaded terminals 29.

The control switch preferably comprises two units S1 and S2 composed respectively of casings or bodies 31 and 32 of insulating material, for example, a phenolic condensation product, the bodies being separated from each other and sealed on either side by disks 33 of similar material. Circumferentially spaced machine screws 34 are employed to hold the assembly together, and the assembly is held in proper relation on a square portion of the shaft 18 by an enlarged portion 21 and a nut 22 secured to the shaft.

Each of the units S1 and S2 contains reservoirs, chambers, or compartments interconnected by passages for causing, upon rotation of a switch about its axis, transfer of a conductive fluid, such as mercury, brine solution, or the like, between the various chambers to bridge, under certain conditions, the inner ends 25a and 26a of electrical contacts 25 and 26 which extend through and have portions enclosed within certain of the chambers. The unit S1 tends to cause reclosure of the circuit breaker after successive opening movements thereof, and after a predetermined number of successive opening movements, the unit causes the circuit breaker to be locked open, while the unit S2 provides a timing arrangement between the opening and reclosing movements of the circuit breaker.

Fig. 4 shows the arrangement of the reservoirs, chambers, and inter-connecting passages in the unit S1, with the unit in a position corresponding to an open position of the circuit breaker, and after the first opening movement of the circuit breaker has occurred. The body 31 has reservoirs or chambers 35, 37 and 40, connected by the various channels or passageways 36, 39, 41 and 43, and mercury or other suitable conductive fluid is caused to flow from and into the various chambers and reservoirs, for forming, under certain conditions, a current conducting path between the pair of contact members or electrodes disposed within recesses 38 opening into a side wall of the measuring chamber 37.

As shown in Fig. 4, and after the first opening movement of the circuit breaker has occurred, mercury from the reservoir 35 has flowed through channel or conduit 36 into the measuring chamber 37, the level of the mercury in the latter chamber being above the recess 38 so that mercury is in contact with the inner ends 25a of the two electrodes 25 to thereby close a circuit between them. Assuming conditions to be such (dependent upon the action of the time unit S2, described hereinafter) that the closing coil of the circuit breaker will be energized at this time by closure of the circuit between the electrodes 25, the circuit breaker will close and the control switch will be rotated in a counter-clockwise direction, as viewed in Fig. 4, from a to b. Upon this movement of the control switch, the mercury in the measuring chamber 37 will flow through channel 39 into a storage reservoir 40. Assuming further that the abnormal conditions have not been removed from the circuit controlled by the circuit breaker, and that the circuit breaker is tripped out a second time, due to such abnormal conditions, this will again cause rotation of the control switch in a clockwise direction to the position shown in Fig. 4, and a second flow of mercury from reservoir 35 will pass through channel 36 and fill the measuring chamber 37 to again close the circuit between terminals 25. The circuit breaker will again close, the control switch will again be rotated counter-clockwise from a to b, and the second mass of mercury in chamber 37 will flow through channel 39 to reservoir 40. If abnormal conditions still remain, the circuit breaker will again be opened, the control switch again rotated to the position shown in Fig. 4, and the remaining mercury in reservoir 35 will flow into the measuring chamber 37, and thereby cause a third reclosing of the circuit breaker.

If the circuit breaker is again opened by the abnormal conditions, the control switch is again rotated to the position shown, in which mercury from the reservoir 35 could run into the measuring chamber 37, but as there is no mercury remaining in chamber 35, no circuit will be closed between the terminals 25 and the energizing circuit of the closing coil of the circuit breaker will remain open, the control switch thus locking out the circuit breaker. The ratio of the volumes of the reservoir and measuring chamber determine the number of reclosures permitted before locking out the circuit breaker, and this ratio may be such as to give any desired number of reclosing movements.

When normal conditions again obtain, and the circuit breaker is closed either manually or by auxiliary means, the control switch will be rotated from a to b, in which position the mercury, which is now all in the storage reservoir 40, will return through the slow leak passage 41, into reservoir 35 until the levels of the mercury in the two reservoirs are the same, and thus the control switch is automatically reset after a given time interval, for example, from 2 to 30 minutes, dependent upon the area of the slow leak passage 41. A screw-threaded plug member 42 is provided for initially inserting the mercury into the unit S1. A small passageway 43 connects the measuring chamber 37 with reservoir 35 to provide for an interchange of air, and thus prevent the formation of an air trap in the measuring chamber 37 due to the flow of the mercury. The area of the passageway, however, is sufficiently small to prevent mercury from flowing therethrough so that no mercury flows from chamber 37 through this passage.

Fig. 5 shows the arrangement of the reservoirs, chambers, and inter-connecting passages in the body 32. The reservoir 44 is in communication, by means of a restricted channel or passage 45, with a measuring chamber 46, and the mercury flows from the reservoir into the measuring chamber when the control switch is in the position shown in Fig. 5, corresponding to open position of the circuit breaker. Two electrodes or contact members 26 are enclosed in a recess 47 opening into a side wall of the measuring chamber, and after a given time interval, as determined by the area of the restricted passage 45, the mercury level in the measuring chamber will rise and flow into the recess 47 to contact with and close a circuit between the electrodes 26.

The energizing circuit of the closing coil of the circuit breaker is controlled jointly by the condition of contacts 25 of unit S1 and contacts 26 of unit S2, as by a series connection of the contacts, so that the circuit breaker will not be closed until after a given time interval, determined by the time required for a sufficient volume of mercury to flow from reservoir 44 into measuring chamber 46 to close the circuit between the electrodes 26. After the first reclosure movement of the circuit breaker, the unit S2, in common with unit S1, will be rotated in a counter-clockwise direction, as viewed in Fig. 5, from a to b, in which position the mercury in the measuring chamber will at once return by way of passage 48 to the reservoir 44 so that, regardless of the number of successive opening movements of the circuit breaker, sufficient mercury will be present in the reservoir to fill the measuring chamber 46 to a point above the recess 47. When the unit S2 is rotated to the position shown in Fig. 5, some of the mercury in passage 48 will return to the chamber 46, but this amount is relatively small, and its effect may generally be disregarded in computing the timing of the unit. A screw-threaded member 49 is provided for initial insertion of the mercury.

Instead of controlling the timing of the unit S2 by means of the area of the passage 45, a needle valve 50, or equivalent, may be employed for adjusting the rate of flow of mercury through the passage, as shown in Fig. 5a.

Figure 6:
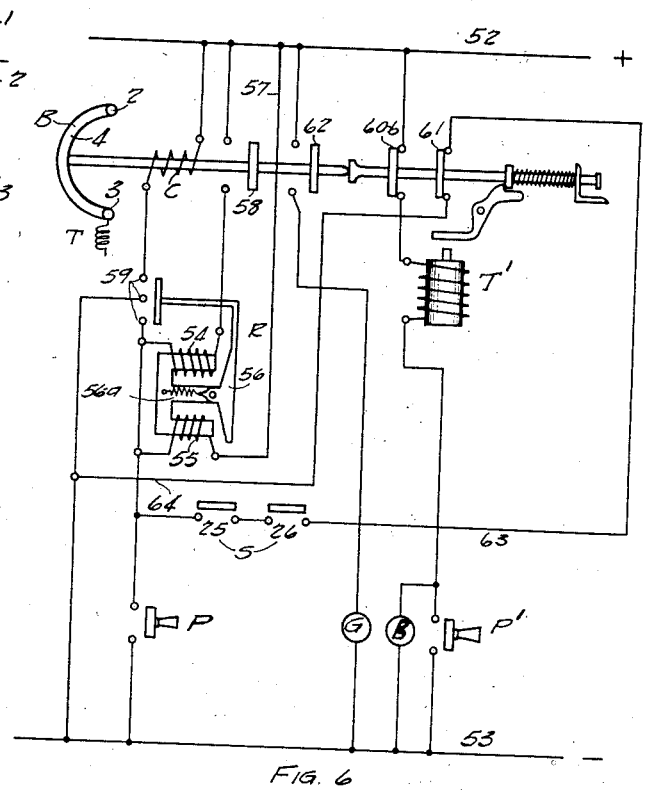
Fig. 6 illustrates a suitable control system for a circuit breaker, embodying the control switch of the invention.

A suitable control system for a circuit breaker, and including the control switch, is shown in Fig. 6. The circuit breaker B has its closing coil C energized through contacts 59 by movement of an armature 56 of a relay R, the armature being biased by spring means 56a to the intermediate position shown, and controlling the circuit between contacts 59. Control of the circuit breaker is obtained by two circuits, either manually by a switch or push-button P causing closure of the contacts 59 of the relay R, or by contacts 25, 26 controlling relay R. The relay has an operating coil 54 and a holding coil 55. The closing push-button P is connected to both the operating and holding coils of the relay. The holding coil is connected directly, by means of conductor 57, to the positive control bus 52, while the operating coil 54 is connected through a pallet switch 58 to the positive control bus. Pallet switch 58 is mechanically operated in accordance with movement of the circuit breaker, and is adapted to open when the circuit breaker is closed, and to close when the circuit breaker is opened.

The operating coil 54 of the relay is stronger than the holding coil 55, and therefore, when both coils are energized simultaneously, coil 54 predominates and contacts 59 are closed, thus energizing the closing solenoid C. The circuit thus completed short-circuits the control push-button P so that it may be momentarily closed and then released without affecting the operation of the circuit breaker. At the end of the closing operation of the circuit breaker, the pallet switch 58 in the relay operating coil circuit is opened, thus deenergizing the operating coil 54 and permitting the armature 56, which is normally biased to an intermediate position to break the relay contacts 59. If, during this process, the control button P has been held closed, the holding coil 55 is energized and draws the armature 56 to its pole face, preventing reclosing of the relay contacts 59 through possible re-energization of the operating coil 54. This action prevents reclosure of the circuit breaker in the event the circuit breaker should reopen by reason of an abnormal condition during the attempted closure by switch P. The relay R is preferably of the type disclosed and claimed in a copending application of George A. Healis and Herbert C. Graves, Serial No. 563,962, filed September 21, 1931, for Switch control system and apparatus.

The control switch S, represented by contacts 25, 26, is connected in parallel with the switch P, and the contacts 25, 26 are connected in series with each other and also in circuit, by means of conductor 63, with an auxiliary or pallet switch 61 operated by the circuit breaker, which switch is closed when the circuit breaker is closed and which opens only when the circuit breaker is tripped manually. This switch will, therefore, remain closed when the circuit breaker has been opened due to an abnormal condition, and in this case, it permits the control switch to determine the proper intervals for reclosing the circuit breaker.

The trip coil T', for opening the circuit breaker, is connected in circuit with a push-button or switch P' and an auxiliary or pallet switch 60b operated by the circuit breaker, which switch is closed when the circuit breaker is closed, and which opens only when the circuit breaker is tripped manually, as in the case of switch 61 hereinbefore referred to. This arrangement also permits the tripping circuit to function, irrespective of the condition of the other control circuits, and makes possible the energization of the trip coil T' from the switch P' after the circuit breaker has opened due to overload or other abnormal condition, or when it has been locked open by the control switch S. The operation of the trip coil at this time, through the tripping mechanism, causes the pallet switches 60b and 61 to open, thus disconnecting the trip coil and control switch contacts 25, 26 from the circuit. When the circuit breaker is automatically opened, due to abnormal conditions, it is under the supervision or control of the switch S; when the circuit breaker is tripped by hand, or by the switch P', the control switch S is disconnected from the circuit; thus the circuit breaker remains open until it is closed either by hand or by the closing switch P, after which the switch S again controls.

A signal lamp B is connected in parallel with the push-button P', and burns whenever the auxiliary switch 60b is closed. A second signal lamp G is connected through an auxiliary or pallet switch 62, which switch is open when the circuit breaker is closed, and the lamps B and G, therefore, indicate the condition of the circuit breaker; when the circuit breaker is closed, lamp R burns; when the circuit breaker has been opened or tripped manually, the lamp G will burn; and when the circuit breaker is open, having been tripped by abnormal or overload condition, both lamps G and B will burn.

The switching device or unit shown in Jensen Patent No. 1,909,540 is suited for use as switches 60b, 61 and 62 by providing extra contacts for each shaft, or by using two such units.

It will be understood that various other control systems may be employed in lieu of that illustrated. Also, the control switch units S1 and S2 may comprise individual units and may, for convenience, be located in different positions, it only being necessary that the units be rotated in unison to either of two positions corresponding to the movement of the circuit breaker. It is, furthermore, not necessary that the units S1 or S2 be actuated by link mechanism, as shown in Fig. 1; either of the units may be rotated by various other position-controlling means known in the art, for example, electromagnetic mechanism, as a solenoid, controlled by a pallet switch actuated by movement of the circuit breaker, so that the solenoid is energized or deenergized in accordance with the position of the circuit breaker to cause or permit rotation of the units S1 or S2 to either of two positions corresponding to the position of the circuit breaker. In such an arrangement, the units S1 or S2 may be biased to one position, as by a spring or weight, and therefore, the solenoid is required to act in one direction only to rotate the units to their other position upon movement of the circuit breaker to a given position.

If the time interval between the opening and reclosing movements of the circuit breaker is unimportant, it is also possible to use the unit S1 alone, without employing unit S2. Either of the units may be replaced by corresponding units having different operating characteristics to thereby give a different number of successive reclosing movements, or different timing characteristics, or both, to the circuit breaker and control circuit.

The portions of the chambers and passages, and particularly the contact enclosing chambers, of the switch units unoccupied by the conductive liquid or mercury may be filled with a non-conducting fluid, chemically inert with respect to the switch elements, and adapted to minimize or prevent chemical change in the conductive liquid or mercury, or in the electrode material, by arcing occurring at the contacts or electrodes. An inert gas, as nitrogen, argon, etc., may be used; or a liquid, of lower density than that of the conductive liquid, such as carbon tetrachloride, may be employed for this purpose.

The contact arrangement of either of the units of the control switch provides for a quick-make mercury contact, and also insures that an amount of mercury sufficient to carry a substantial current, flows into contact with the electrodes 25 or 26 at the time of making contact. The electrodes of each unit are positioned within recesses 38 and 47, respectively, and the recesses have a small cross-section as compared with that of the measuring chambers 37 or 46, so that when the convex meniscus of the mercury breaks as its level rises above the openings of the recesses, a relatively large amount of mercury will flow into the recesses and cover the electrodes, and there will be ample depth of mercury to carry a substantial current. The recesses are preferably, although not necessarily, inclined downwardly, as shown, to further facilitate quick-make action at the time of making contact. The electrodes of each unit may be positioned in the same recess, or individual recesses for each electrode may be provided. Also, one of each set of electrodes may extend through the wall of the measuring chamber so that it is in contact with the mercury before the other electrode which is positioned within a recess.

What I claim is:

1. The combination with a circuit-controlling device operating upon occurrence of an abnormal condition of the circuit controlled thereby, an electro-motive actuating means energizable for resetting of said device, structure for controlling said electro-motive means comprising a reservoir for electrically conductive fluid and contact structure for engagement thereby controlling the energization of said electromotive means, and means for actuating said structure in response to abnormal condition operation of said circuit-controlling device to cause flow of said electrically conductive fluid to change the circuit-controlling relation thereof with respect to said contact structure.

2. The combination with a circuit-controlling device operating upon occurrence of an abnormal condition of the circuit controlled thereby, an electro-motive actuating means energizable for resetting of said device, structure for controlling said electro-motive means comprising a reservoir for electrically conductive fluid and contact structure for engagement thereby controlling the energization of said electromotive means, and means for actuating said structure in response to abnormal condition operation of said circuit-controlling device to a position causing gravity flow of the conductive liquid to change its circuit-controlling relation with respect to said contact structure.

3. The combination with a circuit breaker which opens upon occurrence of an abnormal condition of the circuit protected thereby and an electromagnetic closing device therefor, of switch structure for controlling said closing device, comprising a reservoir of conductive fluid and contact elements connected to the energizing circuit of said closing device, means for moving said switch structure in response to the opening movement of said circuit breaker, and means whereby said movement of the switch structure causes a flow of said fluid to close the circuit between said contact elements.

4. The combination with a circuit breaker which opens upon occurrence of an abnormal condition of the circuit protected thereby and an electromagnetic closing device therefor, of rotatably mounted switch structure for controlling said closing device, comprising a reservoir of conductive fluid and contact elements connected to the energizing circuit of said closing device, means for rotating said switch structure from one position to a different position in response to the opening movement of said circuit breaker, and means whereby said rotation of the switch structure causes a flow of said fluid to close the circuit between said contact elements.

5. The combination with a circuit breaker which opens upon occurrence of an abnormal condition of the circuit protected thereby and an electromagnetic closing device therefor, of switch structure for controlling said closing device, comprising a reservoir of conductive fluid and a chamber in communication therewith enclosing contact elements connected to the energizing circuit of said closing device, a storage chamber in communication with said contact enclosing chamber, means for moving said switch structure from one position to a different position in response to the opening movement of said circuit breaker, means whereby said movement of the switch structure causes a flow of said fluid from said reservoir to said contact enclosing chamber to close the circuit between said contact elements, and means for causing said fluid to flow from the contact enclosing chamber into the storage chamber upon reclosing movement of the circuit breaker.

6. The combination with a circuit breaker which opens upon occurrence of an abnormal condition of the circuit protected thereby and an electromagnetic closing device therefor, of switch structure for controlling said closing device, comprising a reservoir of conductive fluid and a chamber in communication therewith enclosing contact elements connected to the energizing circuit of said closing device, a storage chamber in communication with said contact enclosing chamber, means for moving said switch structure from one position to a different position in response to the opening movement of said circuit breaker, means whereby said movement of the switch structure causes a flow of said fluid from said reservoir to said contact enclosing chamber to close the circuit between said contact elements, means for returning the switch structure to its first position upon reclosing movement of the circuit breaker, and means whereby said movement causes the fluid to flow from the contact enclosing chamber into the storage chamber.

7. The combination with a circuit breaker which opens upon occurrence of an abnormal condition of the circuit protected thereby and an electromagnetic closing device therefor, of switch structure for controlling said closing device, comprising a reservoir of conductive fluid and a chamber in communication therewith enclosing contact elements connected to the energizing circuit of said closing device, a storage chamber in communication with said contact enclosing chamber, means for moving said switch structure from one position to a different position in response to the opening movement of said circuit breaker, means whereby said movement of the switch structure causes a flow of said fluid from said reservoir to said contact enclosing chamber to close the circuit between said contact elements, means for causing said fluid to flow from the contact enclosing chamber into the storage chamber upon reclosing movement of the circuit breaker, and means for causing said fluid to return to the reservoir after a predetermined time interval.

8. The combination with a device operating upon occurrence of an abnormal condition of the circuit protected thereby and an electromotive device therefor, of switch structure for controlling said electromotive device comprising a plurality of fluid reservoirs and separate circuit controlling means in the energizing circuit of said electromotive device jointly controlling energization thereof, and means for actuating said switch structure in response to the operation of the first-named device to cause flow of conductive fluid from said reservoirs to change the condition of said circuit-controlling means.

9. The combination with a device operating upon occurrence of an abnormal condition of the circuit protected thereby and electro-motive device therefor, of switch structure for controlling said electromotive device comprising a plurality of liquid reservoirs and separate circuit-controlling means connected to and jointly controlling the energizing circuit of said electromotive device, and means for actuating said switch structure in response to the operation of the first-named device to a position causing gravity flow of a conductive liquid from said reservoirs to change the condition of said circuit-controlling means.

10. The combination with a circuit breaker operating upon occurrence of an abnormal condition of the circuit protected thereby and an electromotive device thereof, of switch structure for controlling said electromotive device comprising separate reservoirs of conductive fluid and separate sets of contacts connected in circuit with and jointly controlling said electromotive means, and means responsive to the operation of said circuit breaker for causing a flow of said conductive fluid to change the circuit controlling condition of said contacts.

11. The combination with a circuit breaker which opens on occurrence of an abnormal condition of the circuit protected thereby and an electromagnetic closing device therefor, of switch structure for controlling said closing device, comprising a plurality of units, each of said units having a reservoir of conductive fluid and contact elements in the energizing circuit of said closing device, means for moving each of the said units of the switch structure to a different position in response to the opening movement of said circuit breaker, and means whereby said movement of the units causes a flow of the conductive fluid from the reservoirs to close the circuit between the respective contact elements.

12. The combination with a circuit breaker which opens upon occurrence of an abnormal condition of the circuit protected thereby and an electromagnetic closing device therefor, of switch structure for controlling said closing device, comprising reservoirs of conductive fluid and chambers in communication respectively with said reservoirs enclosing contact elements connected to the energizing circuit of said closing device, means for moving said switch structure to a different position in response to the opening movement of said circuit breaker, means whereby said movement of the switch structure causes a flow of said fluid from said reservoirs to said chambers respectively to close the circuit between said contact elements, and means for varying the rate of flow of the fluid from one of said reservoirs upon successive opening movements of said circuit breaker.

13. The combination with a circuit breaker which opens upon occurrence of an abnormal condition of the circuit protected thereby and an electromotive closing device therefor, of switch structure for controlling said closing device comprising two units, each of said units having a fluid reservoir and circuit controlling means in the energizing circuit of said electromotive closing device, means for simultaneously actuating said units in response to the opening and closing movements of the circuit breaker, to cause a flow of conductive fluid from said reservoirs to change the condition of said circuit controlling means, one of said units having means for determining the number of successive reclosure movements of the circuit breaker and the other unit having means for determining the time interval between successive opening and reclosing movements of the circuit breaker.

14. The combination with a circuit breaker which opens upon occurrence of an abnormal condition of the circuit protected thereby and an electromotive closing device therefor, of switch structure for controlling said closing device, means for moving said switch structure to either of two circuit-controlling positions in response to the opening and closing movements of the circuit breaker, the switch structure comprising a first reservoir of conductive liquid and a first chamber in communication therewith enclosing contacts, means comprising a storage chamber in communication with said first chamber for limiting the number of successive reclosure movements of the circuit breaker, a second reservoir of conductive liquid and a second chamber in communication therewith enclosing other contacts, means for limiting the rate of flow of said conductive liquid from the second reservoir to the second chamber, the contacts in said first and second chambers connected in circuit with and jointly controlling the energization of said electromotive closing device.

15. The combination with a circuit-breaker which opens automatically upon occurrence of an abnormal circuit condition and an electromotive closing device therefor, a relay for controlling the circuit of said closing device, a manually operable switch for energizing said relay, means for disabling said relay for continued closure of said manually operable switch to prevent repeated reclosures and trippings of the circuit breaker if abnormal circuit conditions persist and switching means operated upon automatic opening of said circuit breaker for energizing said relay after a predetermined time interval to effect reclosure provided that said manually operable switch is open.

16. The combination with a circuit-breaker which opens automatically upon occurrence of an abnormal circuit condition and an electromagnetic closing device therefor, a relay for controlling the circuit of said closing device, a manually operable switch for energizing said relay, means for disabling said relay for continued closure of said manually operable switch to prevent repeated reclosures and trippings of the circuit breaker if abnormal circuit conditions persist, switching means operated upon automatic opening of said circuit-breaker for energizing said relay after a predetermined time interval to effect reclosure provided that said manually operated switch is open, and switching means operated by said circuit-breaker for rendering said first switching means inoperative after a predetermined number of automatic reclosures within a predetermined period of time.

17. A system comprising a controlled device, means for moving said device from a first to a second position upon occurrence of a given condition, an electro-motive device for returning the controlled device to its first position, means for controlling said electro-motive device including a switch unit, means for moving the switch unit to either of two circuit controlling positions in accordance with movement of the controlled device, said switch unit comprising contact members controlling the energization of said electromotive device, means for causing gravitational flow of successive masses of a fluid to change the circuit controlling condition of said contacts to energize the electro-motive device and return the controlled device to its first position upon successive movements of the controlled device to its second position in response to said given condition, said switch unit including means to prevent energization of said electro-motive device after a predetermined number of successive movements of the controlled device to said second position in response to said given condition.

18. In a protective system, the combination with an automatic circuit breaker having means to open it upon occurrence of an abnormal condition, an electromotive closing device therefor, means for controlling said electromotive device including a switch unit, means for moving the switch unit to a different position in response to the opening movement of the circuit breaker, the switch unit comprising contact members controlling the energization of said electromotive device, means for causing gravitational flow of successive masses of a fluid to close a circuit between said contact members to energize the electromotive device and reclose the circuit breaker upon successive opening movements thereof, said switch unit preventing energization of said electromotive device after a predetermined number of successive opening movements of the circuit breaker.

19. In a protective system, the combination with a circuit breaker having means to open it upon occurrence of an abnormal condition and electromagnetic means for reclosing it, of means for controlling the energization of said reclosing means comprising a switch unit having a reservoir of fluid and contact structure cooperating therewith for control of the energization of said electromagnetic means, means for effecting movement of said switch unit in response to opening of said circuit breaker to effect gravitational flow of said fluid from said reservoir to said contact structure, and means for varying the rate of flow of fluid to said contact structure for successive movements of said unit in response to successive openings of said circuit breaker.

20. The combination with a circuit breaker which opens automatically upon occurrence of an abnormal circuit condition and an electro-motive closing device therefor, a relay for controlling the circuit of said closing device, means for disabling the contacts of said relay during continued energization after closure of the breaker, a manually operable switch for energizing said relay, and switching means operated upon automatic opening of said circuit breaker for energizing said relay after a predetermined time.

21. A protective system comprising a circuit breaker having tripping means responsive to abnormal circuit conditions and a closing coil, and a mercury flow device for controlling the energization of said coil including means for limiting the automatic breaker reclosures to a limited number only if occurring within a predetermined time, and including means for restoring said device to its initial condition if said breaker remains closed for a predetermined time.

22. A protective system comprising a circuit breaker having tripping means responsive to abnormal circuit conditions and closing mechanism, and a mercury flow device actuated upon tripping of the breaker to effect reclosure by said closing mechanism, including means for locking itself open after a predetermined number of reclosures during continuance of abnormal circuit conditions, and including means for restoring itself to initial condition should the breaker remain closed.

23. A system comprising a circuit breaker operating upon occurrence of an abnormal condition of the circuit controlled thereby, means for effecting automatic reclosure of the circuit breaker in response to automatic tripping thereof and including means for locking out the circuit breaker after repeated reclosures and openings due to continuance of abnormal circuit conditions, means manually operable to effect reclosure of the circuit breaker, and means manually operative to effect tripping of said breaker and to disable said automatic reclosing means until the circuit breaker is reclosed by said manually operable reclosing means.

WILLIAM M. SCOTT.